United States Patent [19]

Hickman et al.

[11] 4,111,455
[45] Sep. 5, 1978

[54] METHOD AND APPARATUS FOR MOUNTING A VEHICLE WHEEL ON A VEHICLE FRAME

[75] Inventors: Donald A. Hickman; Samuel L. Kershaw, both of Decatur, Ill.

[73] Assignee: Caterpillar Tractor Co., Peoria, Ill.

[21] Appl. No.: 809,343

[22] Filed: Jun. 23, 1977

[51] Int. Cl.² .................................................. B62D 65/00
[52] U.S. Cl. ........................................ 280/690; 29/464; 228/49; 280/781; 296/28 C; 280/80 R
[58] Field of Search .................. 280/80 R, 96.1, 660, 280/672, 106.5 R, 106 R, 690, 693, 698; 180/89.1, 89.12; 228/7, 49; 296/28 C; 29/464, 468, DIG. 48

[56] References Cited

U.S. PATENT DOCUMENTS

| | | | |
|---|---|---|---|
| 3,341,220 | 9/1967 | Kress | 280/106.5 R |
| 3,372,947 | 3/1968 | Doennecke | 280/698 |
| 3,746,363 | 7/1973 | Borns | 280/661 R X |
| 3,977,489 | 8/1976 | Cole | 180/89.1 |

*Primary Examiner*—John P. Silverstrim
*Attorney, Agent, or Firm*—James R. Bell

[57] ABSTRACT

A vehicle wheel is mounted on spaced apart portions of the vehicle frame. A template is mounted on the frame for aligning an alignment sleeve in the frame. The sleeve is secured on the frame in its aligned position. The template is removed and the wheel is mounted on the frame.

2 Claims, 8 Drawing Figures

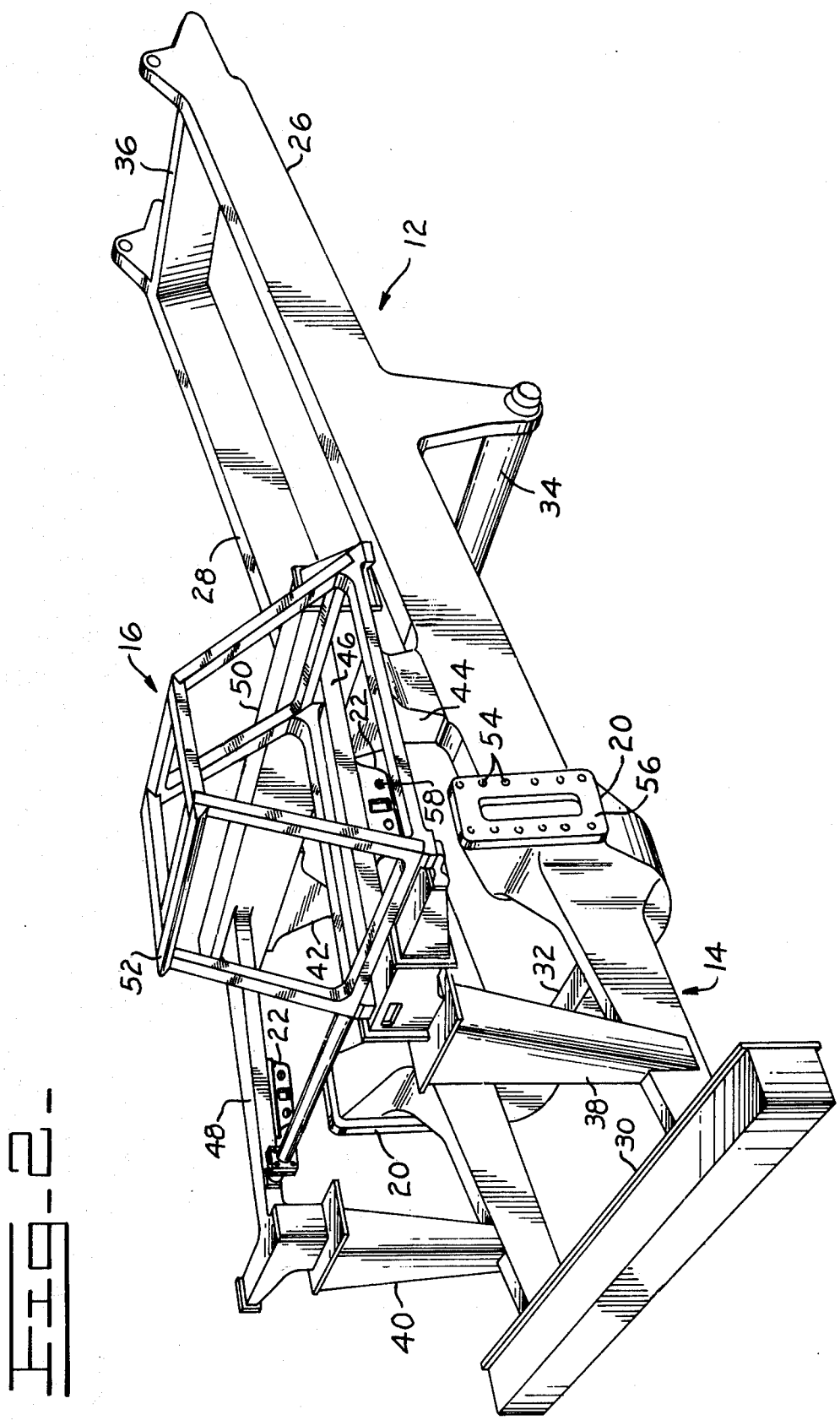

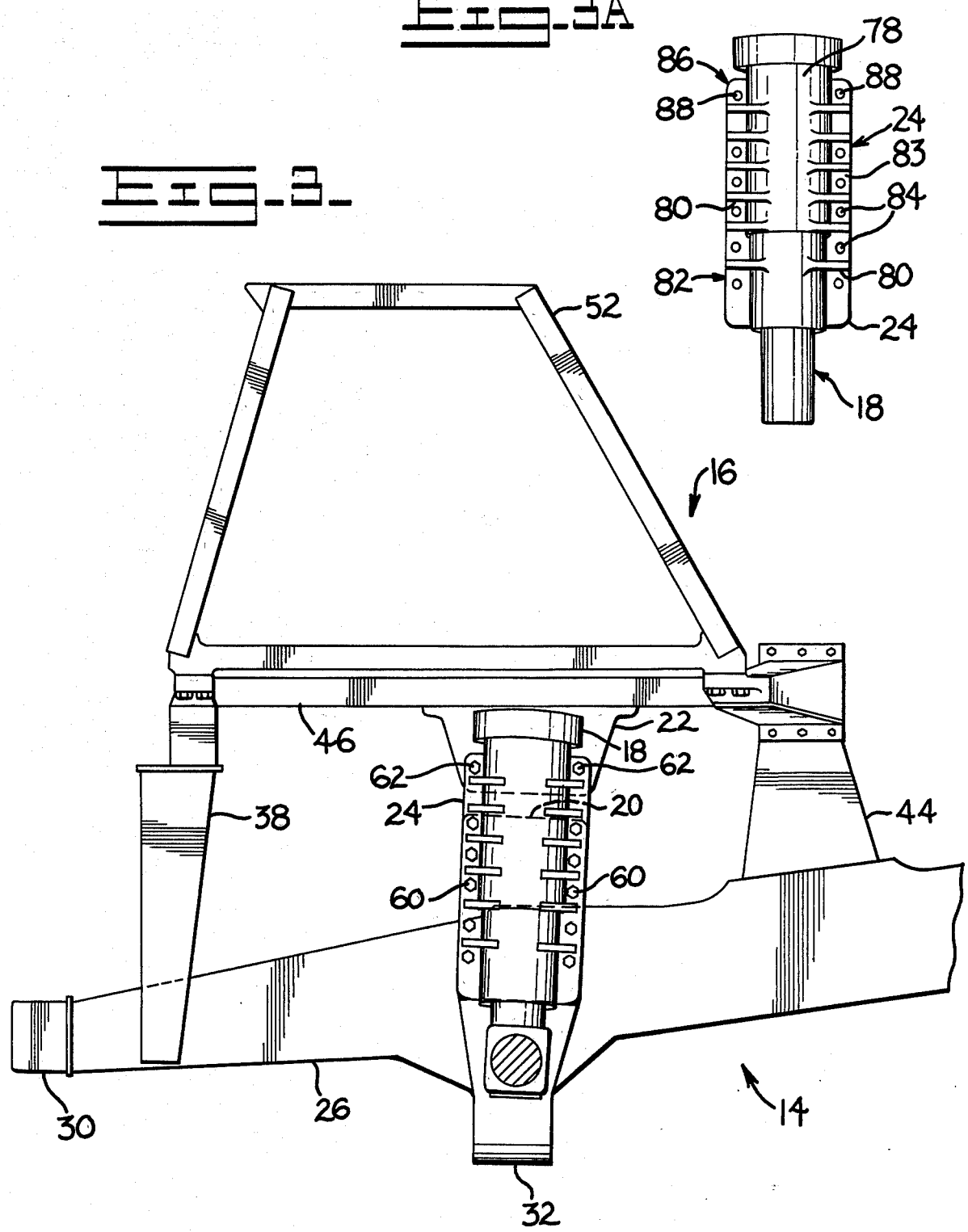

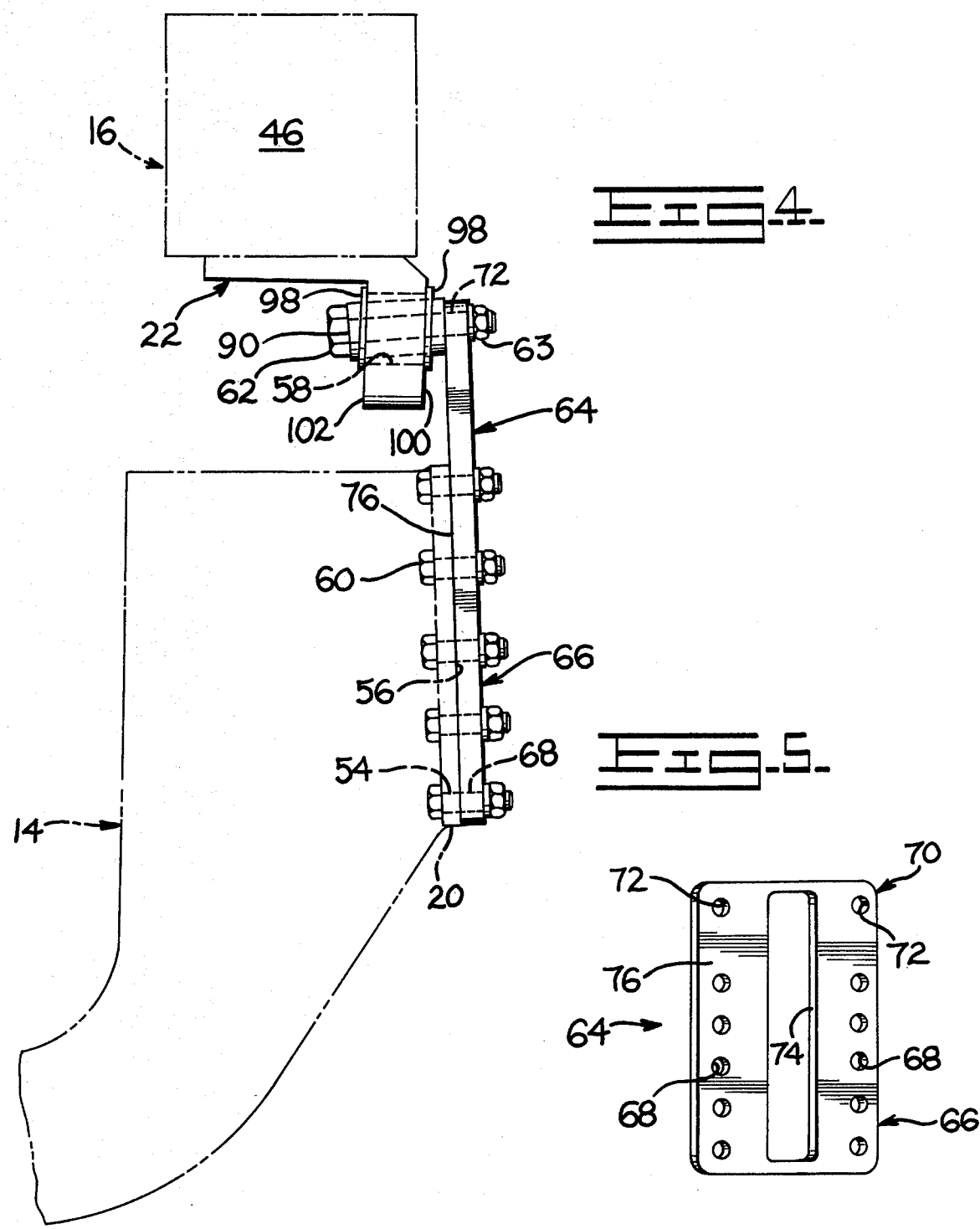

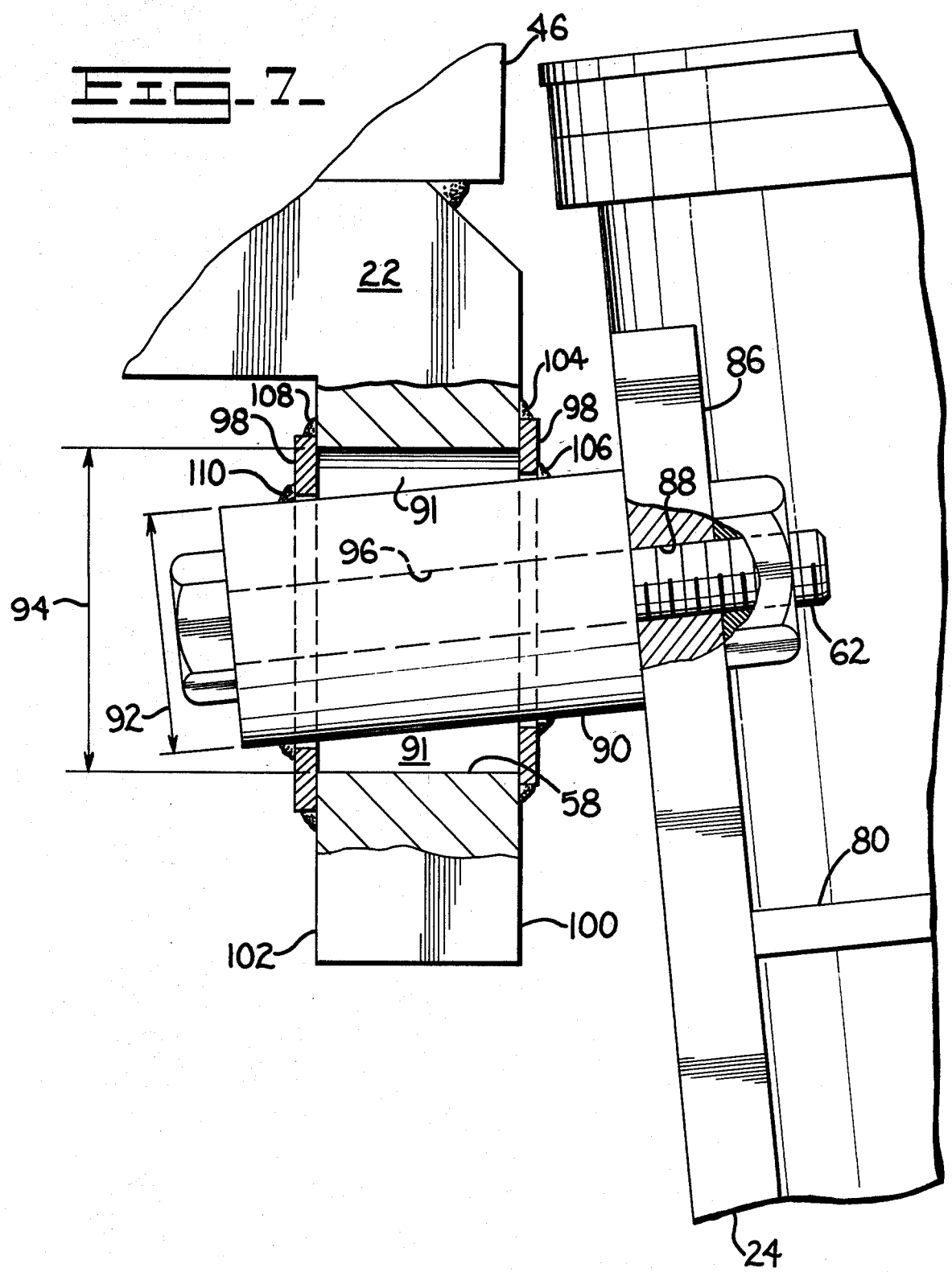

METHOD AND APPARATUS FOR MOUNTING A VEHICLE WHEEL ON A VEHICLE FRAME

BACKGROUND OF THE INVENTION

1. Field of the Invention

This invention relates generally to motor vehicles and more particularly to frames for vehicle bodies.

2. Description of the Prior Art

Heavy duty vehicles include a large intricate framework for supporting the vehicle body and undercarriage.

In such a framework, a mainframe usually supports a subframe. Together, the mainframe and subframe support the vehicle undercarriage and the vehicle body.

Sometimes it is desirable to mount parts of the vehicle, such as wheel supporting struts, to both the mainframe and the subframe. To accomplish this, a mounting plate is usually connected to the strut and bolt holes in the strut mounting plate must then be aligned with bolt holes in the frame.

Difficulty is experienced, however, in properly locating and machining bolt holes in the frames in advance for alignment with bolt holes in the strut plate. This difficulty arises since the portion of the subframe to be bolted to the strut plate is often remotely located with respect to the portion of the mainframe which is to be bolted to the same strut plate.

In view of the above, it would be advantageous to provide a method and apparatus for mounting a vehicle wheel suspension strut which overcomes the problems associated with the prior art.

SUMMARY OF THE INVENTION

The present invention is directed to overcoming one or more of the problems as set forth above.

According to the present invention a vehicle wheel is mounted on spaced apart portions of the vehicle frame.

A first portion of a template is mounted on a first portion of the vehicle frame. An alignment sleeve in a second portion of the vehicle frame is then aligned with a second portion of the template.

Once the sleeve is aligned, it is secured to the second portion of the frame in its desired aligned position.

The template is then removed and the wheel is then mounted in the first and second portions of the frame.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 2 is an isometric view illustrating a vehicle frame including a mainframe and a subframe;

FIG. 3 is a partial side elevational view illustrating a strut mounted on a frame in accordance with this invention;

FIG. 3a is an exploded view illustrating the strut of FIG. 3;

FIG. 4 is a partial end view illustrating a template mounted on the vehicle frame;

FIG. 5 is an isometric view illustrating the template used in accordance with this invention;

FIG. 7 is a partial exploded view illustrating the strut mounted to the subframe.

DETAILED DESCRIPTION

Figure 1:
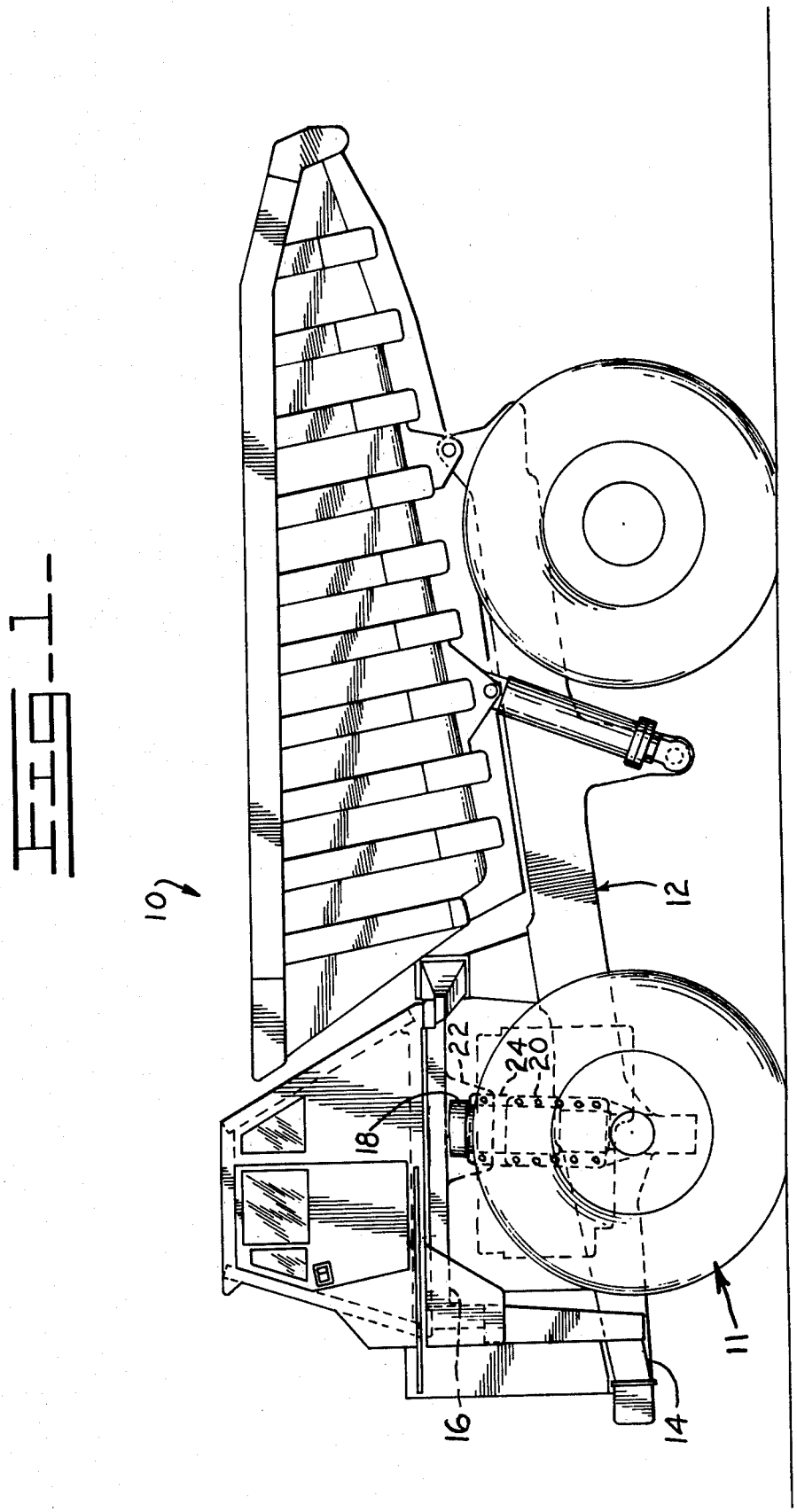
FIG. 1 is a side elevational view illustrating a vehicle having a wheel support strut mounted according to this invention.

Referring now to the drawings, FIG. 1 illustrates a heavy duty vehicle generally designated 10 and having a framework 12 including a first or mainframe portion 14 and a second or subframe portion 16 spaced from mainframe 14.

A wheel 11 is supported by a suspension strut 18 mounted on both the mainframe and subframe portions 14, 16, respectively.

A first mounting bracket 20 is connected to the mainframe 14. Similarly, a second mounting bracket 22 is connected to subframe 16. A mounting plate 24 connected to strut 18 may be connected to brackets 20 and 22.

FIG. 2 illustrates frame 12 including mainframe 14 and subframe 16. As it is well known, mainframe 14 generally includes main side rails 26, 28. Side rails 26, 28 are interconnected by a plurality of cross members 30, 32, 34 and 36. Also included in mainframe 14 are pylons 38, 40, 42 and 44 connected to mainframe 14 and extending upwardly therefrom to support subframe portion 16. Mainframe 14 is generally the lower portion of framework 12.

Also well known is the subframe portion 16 mounted on the pylons 38, 40, 42, 44, usually by welding. Such subframe portions 16 are generally a superstructure mounted on and extending above the lower mainframe 14. Subframes usually include base members such as those illustrated at 46, 48, 50 connected such as by welding to the pylons.

A roll-over structure 52 is preferably connected to and generally part of subframe 16. Such roll-over structures 52 are generally used as the frame for a vehicle cab wherein the operator is stationed.

In accordance with this invention first mounting brackets 20 are connected, preferably by welding, to side rails 26, 28 and second mounting brackets 22 are connected, preferably by welding, to base members 46, 48.

First mounting brackets 20 preferably include a first array of bolt holes 54 formed in a finished surface 56 of bracket 20. Surface 56 is preferably finished for abutting engagement with mounting plate 24 of wheel strut 18.

Second mounting brackets 22 include enlarged bores 58 formed therein. Bores 58 are substantially larger than bolt holes 54 and include an inside diameter large enough to accommodate an alignment sleeve, to be fully discussed later herein, and permit relatively large tolerances or slop between the outside diameter of the sleeve and the inside diameter of bores 58.

In FIG. 3, mounting plate 24 of strut 18 is bolted to first mounting bracket 20 of mainframe 14 by bolts 60. Also, mounting plate 24 is bolted to second mounting bracket 22 of subframe 16 by bolts 62 and nuts 63.

Strut 18, FIG. 3a, includes cylindrical suspension portion 78 having mounting plate 24 secured thereto preferably by welding. Also, reinforcement ribs 80 are preferably welded to suspension portion 78 and plate 24. A first portion 82 of plate 24 preferably includes a finished surface 83 and an array of bolt holes 84 matched with the array 54 in mounting bracket 20 for mounting plate 24 to bracket 20. Also, second portion 86 of plate 24 includes an array of bolt holes 88 for bolting plate 24 to bracket 22.

A template generally designated 64, FIG. 5, includes first portion 66 including a first array of bolt holes 68 and also includes second portion 70 including a second array of bolt holes 72. Template 64 is preferably formed of fabricated steel and may include a cut-out portion 74 to reduce the weight thereof. Surface 76 of template 64 is preferably finished for abutting engagement with finished surface 56 of first mounting bracket 20, see FIG. 4.

The array of bolt holes 68 in template 64 are preferably matched with the array of bolt holes 54 of mounting bracket 20. The second array of bolt holes 72 in template 64 are approximately matched to enlarged bores 58 in bracket 22. Similarly, the second array of bolt holes 88 of mounting plate 24 are approximately matched to enlarged bores 58 in bracket 22.

In FIG. 4, template 64 is illustrated with finished surface 76 of first portion 66 secured by bolts 60 in abutting relationship with finished surface 56 of bracket 20. The array of bolt holes 68 are matched with the array of bolt holes 54 of the mainframe 14.

Second portion 70 of template 64 has its array of bolt holes 72 in the same relative portion as the array of bolt holes 88 in second portion 86 of plate 24. Bolt holes 72 are approximately matched in alignment with enlarged bores 58 of bracket 22.

Alignment sleeve 90, FIGS. 4 and 7, is preferably a substantially thick-walled tubular member of cylindrical cross section and preferably formed of steel. Outside diameter 92 of sleeve 90 is substantially less than inside diameter 94 of bore 58. By "substantially less than" is meant preferably about one-half inch less than inside diameter 94 of enlarged bore 58. Also, sleeve 90 includes bolt bore 96 formed therethrough.

In this manner, with sleeve 90 loosely disposed in bore 58 and abutted against template 64, bolts 62 can be extended through bolt bore 96 and temporarily aligned through bolt holes 72 and thus secured to template 64 by nut 63. This causes bolt bore 96 and sleeve 90 to be aligned as desired for later alignment with bolt holes 88 in mounting plate 24. As such, washers 98 are placed over sleeve 90 in abutment with opposite faces 100, 102 of bracket 22. Washers 98 are preferably tack welded to faces 100, 102 of bracket 22 at 104, 108. Sleeve 90 is preferably tack welded to washers 98 at 106, 110. In this manner, sleeve 90 is disposed in bore 58 in the desired alignment for later bolting bracket 22 to plate 24. Washers 98 assist in concentracting the welding material at the opposite faces 100, 102 and limits weld material from blowing back into the clearance 91 between sleeve 90 and bore 58.

With sleeve 90 temporarily secured in the desired alignment, template 64 can be removed and a permanent weld applied to firmly secure sleeve 90 in bore 58. FIG. 7 illustrates washer 98 welded at 104 to face 100 and welded at 106 to sleeve 90. Also, the other washer 98 is welded at 108 to face 102 and at 110 to sleeve 90.

It is to be understood that the above-mentioned procedure is performed with two sleeves 90 each secured in two spaced bores 58 in the preferred embodiment. Of course, additional enlarged bores can be used if desired.

Figure 6:
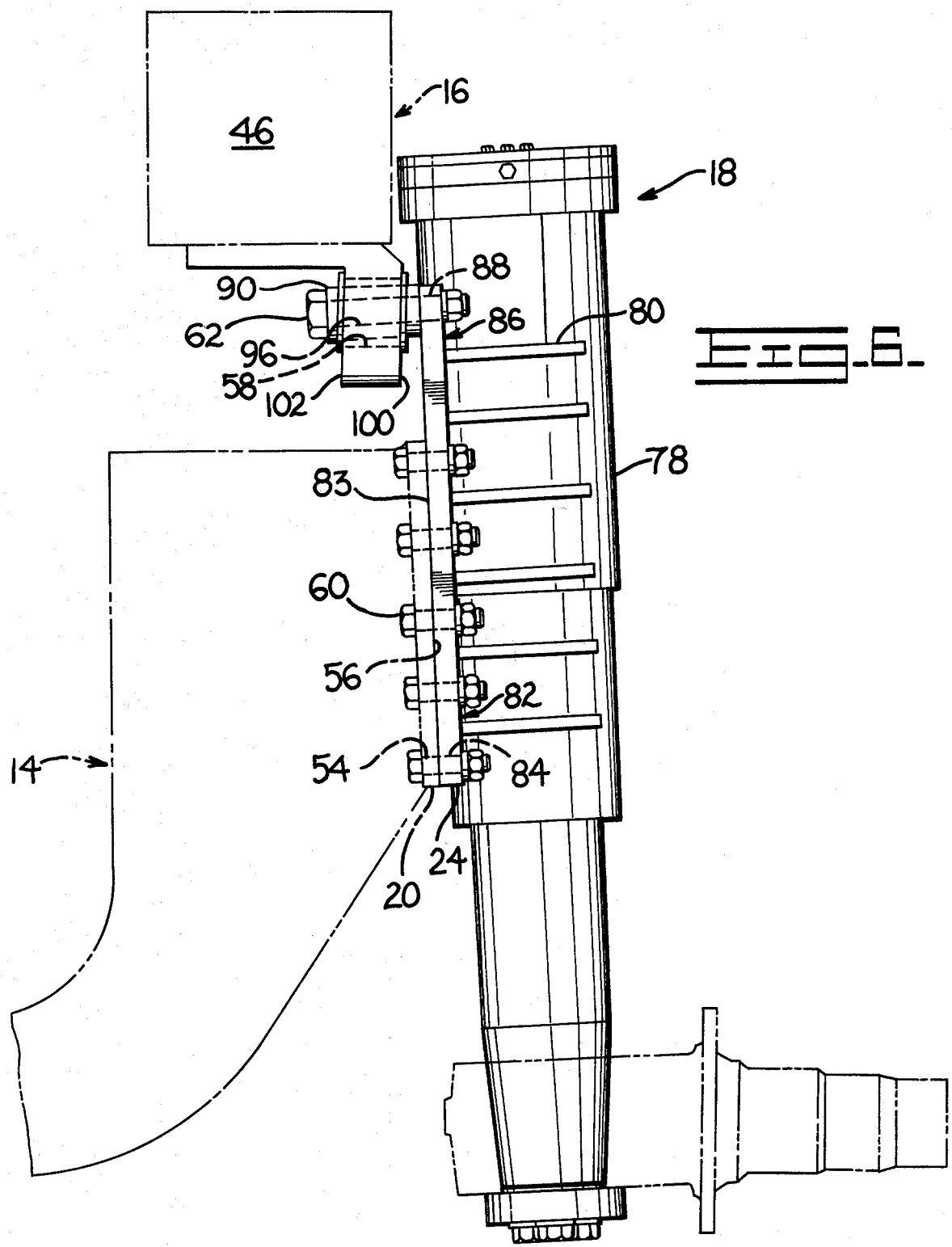
FIG. 6 is a partial end view illustrating the vehicle strut mounted on the vehicle frame.

Referring now to FIGS. 6 and 7, it can be seen that strut 18 can be mounted to frame portions 14, 16 so that finished surface 83 of plate 24 abuts finished surface 56 of bracket 20. The array of bolt holes 84 in plate 24 is matched with the array of bolt holes 54 in bracket 20. Also the array of bolt holes 88 in plate 24 is in matched alignment with the bolt bore 96 of sleeve 90.

Bolts 60 can secure plate 24 to bracket 20 and bolts 62 can secure 24 to bracket 22.

In operation, first portion 66 of template 64 is secured to first portion 14 of frame 12 at bracket 20 by bolts 60. Sleeve 90 is disposed within bore 58. Washers 98 are fitted over sleeve 90 so as to abut faces 100, 102 of bracket 22. Sleeve 90 is positioned to abut template 64 and bolt 62 is inserted through bolt bore 96 and through bolt hole 72 in second portion 70 of template 64. This aligns sleeve 90 and bolt hole 72.

Washers 98 and sleeve 90 are secured to second portion 16 of frame 12 by being tack welded to bracket 22. Template 64 is removed and sleeve 90 retains a fixed relationship or alignment with bracket 22.

Washers 98 and sleeve 90 are then fully and securely welded to second frame portion 16 so that sleeve 90 remains aligned with bolt hole 72 in second portion 70 of template 64.

Strut 18 is then mounted on frame 12 by bolts 60, 62 so that strut plate 24 is secured to first portion 14 and second portion 16 of frame 12.

The foregoing has described a method and apparatus for mounting a vehicle wheel 11 supported by a suspension strut 18 on spaced portions 14, 16 of a vehicle frame.

The embodiments of the invention in which an exclusive property or privilege is claimed are defined as follows:

1. A method for connecting a vehicle wheel to spaced apart mainframe and subframe portions of a vehicle frame using an alignment sleeve and a template representing a vehicle wheel strut plate comprising the steps of:

mounting a first portion of the template on the mainframe so that an array of bolt holes in the mainframe is aligned with a corresponding array of bolt holes in the template and so that a second portion of the template is adjacent the subframe;

placing the alignment sleeve through an enlarged bore in the subframe;

temporarily connecting the sleeve with the second portion of the template in a desired alignment;

securing the sleeve in the bore at said desired alignment;

removing the template from the mainframe and the sleeve;

connecting a first portion of the strut plate to the mainframe so that the array of bolt holes in the mainframe is aligned with a corresponding array of bolt holes in the strut plate; and connecting a second portion of the strut plate to the subframe so that a bolt hole in the second portion is aligned with the alignment sleeve.

2. Apparatus for mounting a strut plate connected to a vehicle wheel on vertically spaced apart mainframe and subframe portions of the vehicle frame, comprising:

a first bracket connected to the mainframe and including an array of holes formed therein, the holes corresponding to an array of holes on the vehicle wheel strut plate;

a second bracket connected to the subframe, the second bracket including an enlarged horizontally extending sleeve bore formed therethrough having an inside diameter;

an alignment sleeve extending through the bore, the sleeve having an outside diameter substantially less than the inside diameter of the sleeve bore and a bolt bore passing through the sleeve, the bolt bore in the sleeve corresponding to a bolt bore in the strut plate; and means connected to the second bracket and the sleeve at opposite ends of the sleeve bore for securing the sleeve within the sleeve bore.

* * * * *